(12) United States Patent
Omino

(10) Patent No.: US 9,230,179 B2
(45) Date of Patent: Jan. 5, 2016

(54) DRIVER ASSISTANCE SYSTEM, DRIVER ASSISTANCE METHOD AND INFORMATION STORAGE MEDIUM

(71) Applicant: NEC Corporation, Minato-ku, Tokyo (JP)

(72) Inventor: Takayuki Omino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 55 days.

(21) Appl. No.: 14/165,825

(22) Filed: Jan. 28, 2014

(65) Prior Publication Data

US 2014/0233795 A1    Aug. 21, 2014

(30) Foreign Application Priority Data

Feb. 19, 2013   (JP) .................................. 2013-029588

(51) Int. Cl.
  *G06K 9/00*   (2006.01)
  *G08G 1/16*   (2006.01)

(52) U.S. Cl.
  CPC ............ *G06K 9/00805* (2013.01); *G08G 1/166* (2013.01)

(58) Field of Classification Search
  None
  See application file for complete search history.

(56) References Cited

U.S. PATENT DOCUMENTS

| 6,023,535 A | 2/2000 | Aoki | |
|---|---|---|---|
| 8,493,198 B1 * | 7/2013 | Vasquez et al. | ............... 340/436 |
| 2004/0252192 A1 | 12/2004 | Adachi et al. | |
| 2007/0147660 A1 * | 6/2007 | Durucan et al. | ............... 382/104 |
| 2010/0157061 A1 * | 6/2010 | Katsman et al. | ............... 348/149 |
| 2012/0169526 A1 * | 7/2012 | Reilhac | ........................... 342/70 |
| 2013/0188886 A1 * | 7/2013 | Petrou et al. | .................. 382/305 |

FOREIGN PATENT DOCUMENTS

| GB | 2476097 A | 6/2011 |
|---|---|---|
| JP | 2002-112007 A | 4/2002 |
| JP | 2010-33321 A | 2/2010 |
| JP | 2010-250501 A | 11/2010 |
| JP | 2011-180670 A | 9/2011 |
| JP | 2012-14689 A | 1/2012 |
| WO | 2008/041532 A1 | 4/2008 |

OTHER PUBLICATIONS

English translation of Japanese Patent Publication 2011-180670, which issued Sep. 15, 2011.*
The Extended European Search Report for EP Application No. 13198511.1 dated on Jun. 4, 2014.
Japanese Office Action for JP Application No. 2013-029588 mailed on Jan. 21, 2014 with English Translation.

* cited by examiner

*Primary Examiner* — Jon Chang

(57) ABSTRACT

A driver assistance system includes a mobile terminal provided on an automobile, and a detection server capable of communicating with the mobile terminal. The mobile terminal includes an image capture apparatus which captures images around the automobile, and an image transmission unit which transmits the captured image to the detection server. The detection server includes an image filter which carries out a working process for the image, and a detection engine which receives the image after the working process by the image filter as an input thereto and detects whether or not the image includes an object. If it is decided that the image includes an object, the detection server transmits the result of the decision to the mobile terminal.

15 Claims, 4 Drawing Sheets

DRIVER ASSISTANCE SYSTEM, DRIVER ASSISTANCE METHOD AND INFORMATION STORAGE MEDIUM

This application is based upon and claims the benefit of priority from Japanese patent application No. 2013-29588, filed on Feb. 19, 2013, the disclosure of which is incorporated herein in its entirety by reference.

TECHNICAL FIELD

The present invention relates to a driver assistance system, a driver assistance method and an information storage medium storing a driver assistance program for detecting an object around a vehicle.

BACKGROUND OF THE INVENTION

In recent years, to realize crash-proof cars, driver assistance systems have been developed that monitor pedestrians, area in front of the vehicle, pedestrians or roadway obstructions to detect potentially dangerous situations and, if necessary, intervene automatically in an effort to avoid a collision. In a typical driver assistance system that detects pedestrians, a camera mounted on the vehicle captures images around the vehicle, and then a vehicle controlling computer called an ECU (Electronic Control Unit) detects and processes objects from the captured images.

For example, Japanese Patent Laid-Open No. 2010-250501 discloses a vehicle system which arithmetically calculates the degree of risk of the driver's vehicle colliding with an object, using image data to determine whether the detected object is a pedestrian.

SUMMARY

An exemplary object of the invention is to provide a driver assistance system, a driver assistance method and an information storage medium by which an object around a vehicle can be detected with a high degree of accuracy.

According to an aspect of the present invention, there is provided a driver assistance system including a mobile terminal provided on an automobile, and a detection server capable of communicating with the mobile terminal, the mobile terminal including an image capture apparatus configured to capture an image around the automobile, and an image transmission unit configured to transmit the captured image to the detection server, the detection server including an image filter configured to carry out a working process for the image, and a detection engine configured to receive the image inputted thereto after the working process by the image filter and detect whether or not the image includes an object, the detection server transmitting, when it is detected that the image includes an object, the result of the decision to the mobile terminal.

According to another aspect of the present invention, there is provided a driver assistance method including transmitting an image around an automobile, the image captured by a mobile terminal provided on the automobile, to a detection server which is capable of communicating with the mobile terminal, carrying out a working process for the image by the detection server, detecting whether or not the image after the working process includes an object, and transmitting, when it is decided that the image includes an object, the result of the decision to the mobile terminal.

According to a further aspect of the present invention, there is provided a non-transitory computer-readable information storage medium storing a driver assistance program that, when executed by an information processing device, causes execution of a method comprising: inputting an image around an automobile, the image captured by an image capture apparatus provided in a mobile terminal provided on the automobile, and carrying out a working process for the image, inputting the image after the working process and detecting whether or not the image includes an object, and transmitting, when it is decided that the image includes an object, the result of the decision to the mobile terminal.

DESCRIPTION OF EXEMPLARY EMBODIMENT

In the following, an exemplary embodiment of a driver assistance system according to the present invention is described with reference to the accompanying drawings.

Figure 1:
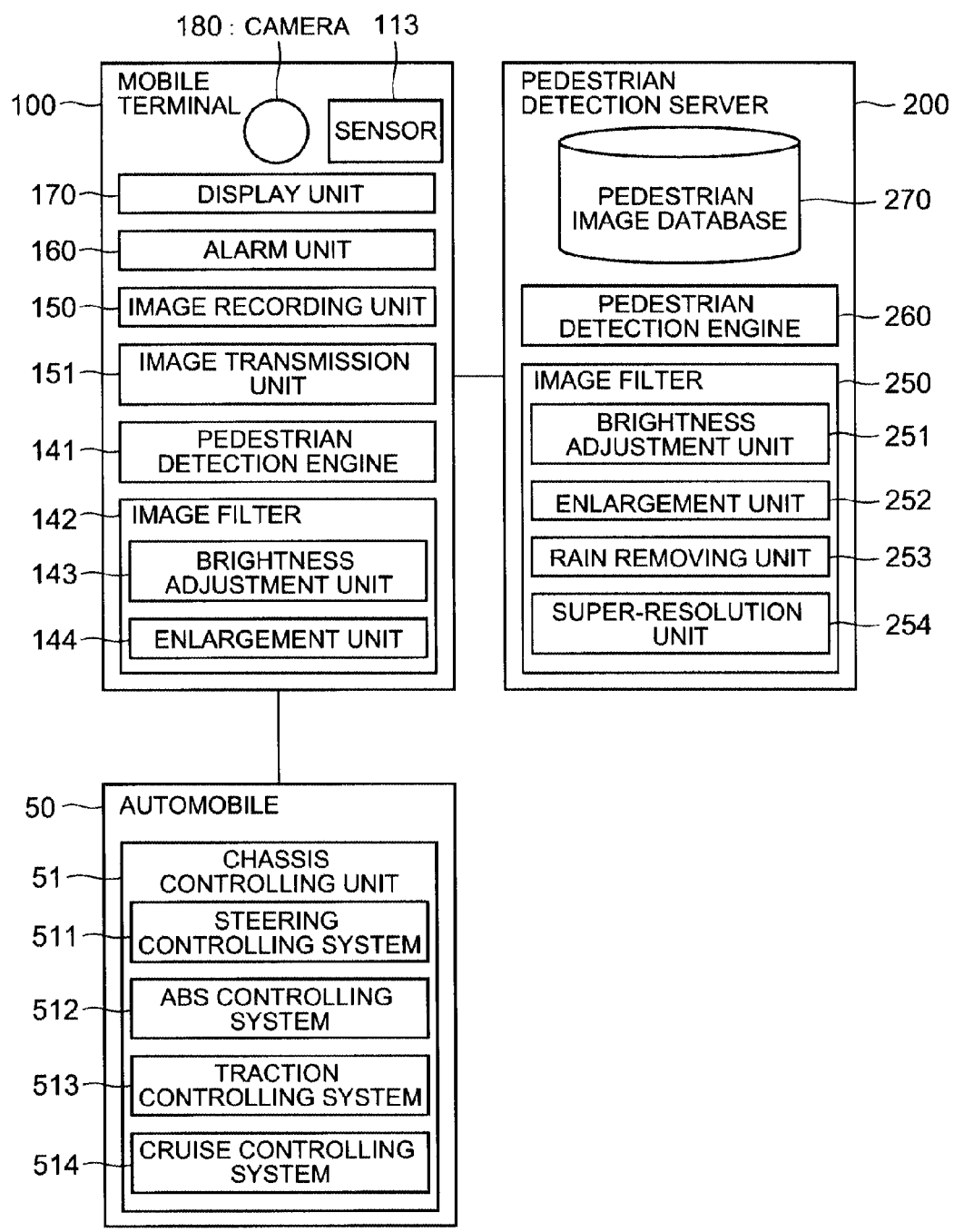
FIG. 1 It depicts a block diagram showing a configuration of a driver assistance system of an exemplary embodiment according to the present invention.

FIG. 1 is a block diagram showing a configuration of the driver assistance system of the present exemplary embodiment. Referring to FIG. 1, the driver assistance system includes an automobile 50 which operates by program control, a mobile terminal 100, and a pedestrian detection server 200.

The automobile 50 includes a chassis controlling unit 51. The chassis controlling unit 51 includes a steering controlling system 511, an ABS (Antilock Brake System) controlling system 512, a traction controlling system 513, and a cruise controlling system 514. The chassis controlling unit 51 can communicate with the mobile terminal 100 through a wireless or wired network. The chassis controlling unit 51 is sometimes controlled in accordance with an instruction transmitted thereto from the mobile terminal 100. In other words, the automobile 50 can carry out such an operation as deceleration, steering or lane change in response to an operation of the mobile terminal 100.

The steering controlling system 511 is a system which controls the direction of the automobile 50 in accordance with a steering operation. The ABS controlling system 512 is a system which prevents locking of the tires due to sudden braking or the like through automatic control of the brake. The traction controlling system 513 is an apparatus which prevents a slip of the tires upon starting and upon acceleration. The cruise controlling system 514 carries out control to maintain a preset speed even if the driver does not continue to operate the accelerator pedal.

The mobile terminal 100 includes a sensor 113, a pedestrian detection engine 141, an image filter 142, an image recording unit 150, an image transmission unit 151, a alarm unit 160, a display unit 170, and a camera 180. The pedestrian detection engine 141 and the image filter 142 are implemented, for example, by hardware designed so as to carry out a particular arithmetic operation process or the like or by an information processing apparatus such as a CPU (Central Processing Unit) which operates in accordance with a program. Information in the image recording unit 150 is stored in a storage apparatus such as, for example, a HDD (Hard Disk Drive) and is temporarily stored into a memory such as a RAM (Random Access Memory) when it is read out from the storage apparatus.

The mobile terminal 100 is, for example, a multi-function smartphone which has a high affinity to the Internet and is produced on the basis of functions of a personal computer. The mobile terminal 100 is installed or mounted, for example, on the dashboard of the automobile 50.

The sensor 113 grasps position information or a situation of the automobile 50 during traveling. The sensor 113 is, for example, a GPS (Global Positioning system) sensor, a three-axis gyro, an acceleration sensor, proximity sensor or an environmental light sensor.

The pedestrian detection engine 141 has a function for detecting a pedestrian from within an image captured by the camera 180 of the mobile terminal 100. In particular, the pedestrian detection engine 141 detects a region deemed as a pedestrian from within an image during traveling and outputs a detection rate representative of the likelihood of that the region is a pedestrian as a score based on a rule determined in advance. Further, the pedestrian detection engine 141 decides whether or not the score satisfies a defined criterion.

It is to be noted that the object to be detected by the driver assistance system of the present exemplary embodiment may not be a pedestrian but may be an obstacle such as, for example, another vehicle or a telephone pole. The following description is based on the assumption that the object is a pedestrian.

The image filter 142 includes a brightness adjustment unit 143 and an enlargement unit 144. The brightness adjustment unit 143 carries out adjustment of the brightness of an image. The enlargement unit 144 carries out expansion of an image. The image filter 142 uses the brightness adjustment unit 143 and the enlargement unit 144 to work an image captured by the mobile terminal 100, into an image from which a pedestrian can be detected readily. The image filter 142 can work and process an image instantly within a performance range of the mobile terminal 100.

The image recording unit 150 records an image captured by the camera 180. The image transmission unit 151 transmits an image recorded in the image recording unit 150 or an image worked and processed by the image filter 142 to the pedestrian detection server 200. The alarm unit 160 originates, when a pedestrian is detected, an alarm by sound or the like to inform the driver that a pedestrian exists.

The display unit 170 displays an image being captured up by the mobile terminal 100 and displays a warning message when a pedestrian is detected.

The camera 180 is a general digital camera and captures an image around the automobile during traveling. An image captured by the camera 180 may be any of a moving image and a still image. It is assumed that, in the present exemplary embodiment, the image captured by the camera 180 is a still image.

The pedestrian detection server 200 includes an image filter 250, a pedestrian detection engine 260, and a pedestrian image database 270. The pedestrian detection engine 260 and the image filter 250 are implemented, for example, by hardware designed so as to carry out a particular arithmetic operation process or by an information processing apparatus such as a CPU which operates in accordance with a program. The pedestrian image database 270 is stored in a storage apparatus such as, for example, a HDD and is temporarily stored into a memory such as a RAM when it is read out from the storage apparatus.

The CPU incorporated in the pedestrian detection server 200 is a high specification central processing unit for a computer server and can carry out higher speed processing than a function of the CPU incorporated in the mobile terminal 100. The CPU incorporated in the pedestrian detection server 200 includes a function for working a captured image transmitted from the mobile terminal 100. The HDD incorporated in the pedestrian detection server 200 is, for example, a built-in hard disk drive. The HDD and the memory incorporated in the pedestrian detection server 200 have a greater capacity than the HDD and the memory incorporated in the mobile terminal 100.

The image filter 250 includes a brightness adjustment unit 251, an enlargement unit 252, a rain removing unit 253, and a super-resolution unit 254. The image filter 250 works a captured image transmitted from the mobile terminal 100, into an image from which a pedestrian can be detected readily.

The rain removing unit 253 removes a region in which rain is imaged from within an inputted image. The super-resolution unit 254 can enlarge an image of a small-sized pedestrian or the like clearly. More particularly, the super-resolution unit 254 superimposes images in animation or a plurality of images captured by continuous shooting to produce a single image of a high resolution.

The brightness adjustment unit 251 and the enlargement unit 252 are incorporated also in a general mobile terminal. On the other hand, the rain removing unit 253 and the super-resolution unit 254 carry out processes and so forth which cannot be carried out instantly by a processing capacity of the general mobile terminal 100.

Although the processes to be carried out by the image filter 250 require an enormous amount of time if they are executed by the mobile terminal 100, they can be carried out rapidly if they are executed by the pedestrian detection server 200. Therefore, in the driver assistance system of the present exemplary embodiment, as the image filter 250 executes image processing, a pedestrian can be detected rapidly on the real time basis.

The pedestrian image database 270 is a database in which images of pedestrians captured by a large number of mobile terminals are stored. In particular, in the pedestrian image database 270, images from which a pedestrian is detected are prepared as an outcome "dictionary". In the dictionary, images of pedestrians of various magnifications and various forms are stored.

The pedestrian detection engine 260 detects a pedestrian from within an image captured by the mobile terminal 100. In particular, the pedestrian detection engine 260 detects a region deemed as a pedestrian from within an image during traveling and outputs a detection rate representative of a likelihood of that the region is a pedestrian as a score based on a rule determined in advance. Further, the pedestrian detection engine 260 decides whether or not the scores satisfies a defined criterion.

When the score of an image after the processing by the image filter 250 is carried out does not satisfy the defined criterion, the pedestrian detection engine 260 searches for and extracts a pedestrian image of a high resolution similar to the region of the inputted image deemed as a pedestrian from within the dictionary stored in the pedestrian image database 270. In other words, the pedestrian detection engine 260 can refer to the pedestrian image database 270 to obtain a pedestrian image of a high resolution, which is similar to a single input image. Then, when a similar image is found out, the pedestrian detection engine 260 detects a pedestrian based on the similar image.

Figure 2:
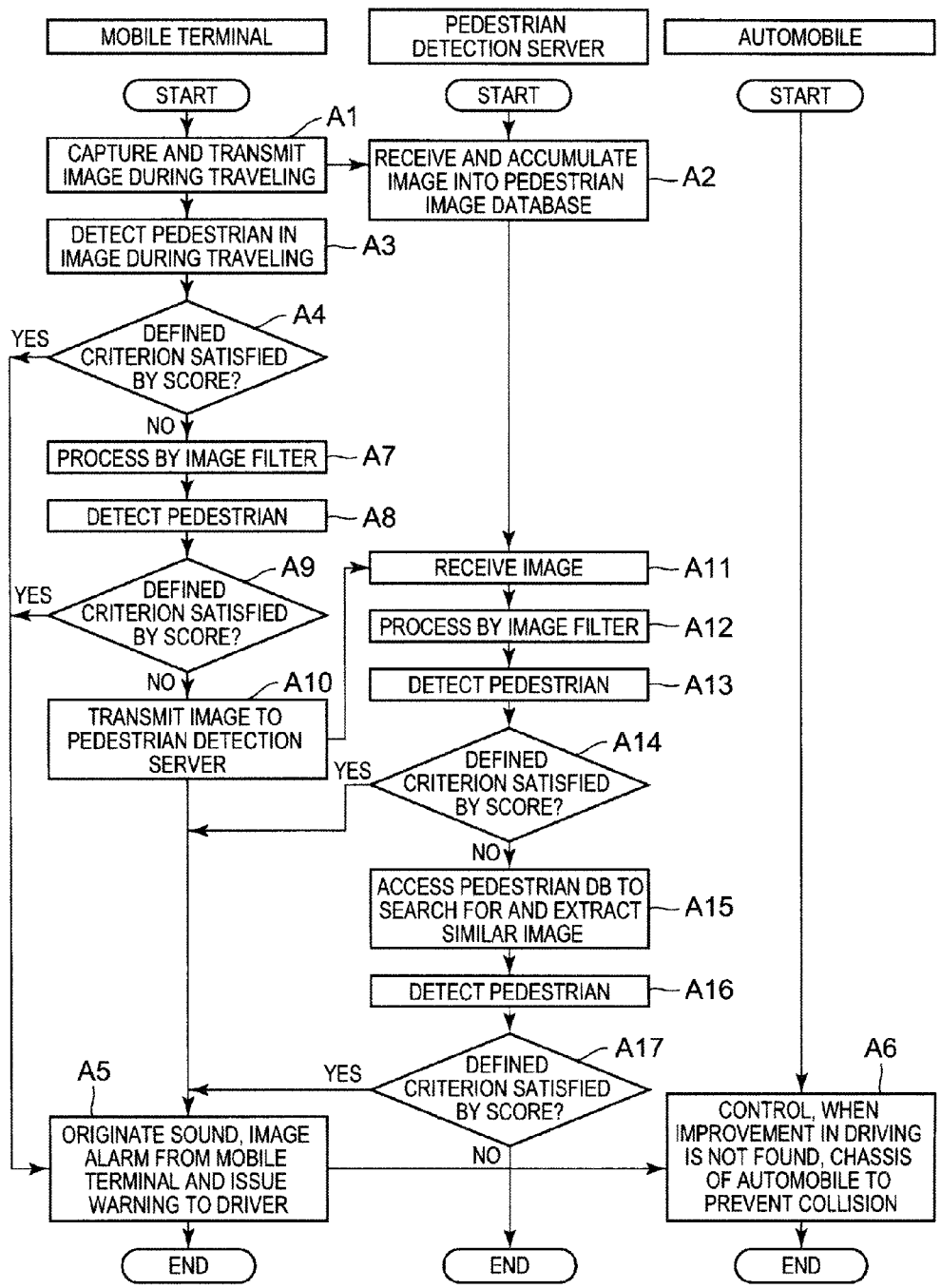
FIG. 2 It depicts a flow chart illustrating operation of the driver assistance system of the exemplary embodiment according to the present invention.

Now, operation of the driver assistance system of the present exemplary embodiment is described. FIG. 2 is a flow chart illustrating operation of the driver assistance system of the present exemplary embodiment.

First, the camera 180 provided on the mobile terminal 100 captures an image around the automobile 50 during traveling. The image transmission unit 151 transmits the captured image to the pedestrian detection server 200 (step A1).

The pedestrian detection server 200 stores the image transmitted thereto into the pedestrian image database 270 (step A2). The pedestrian detection engine 141 detects a region deemed as a pedestrian from within the image during traveling and outputs a detection rate as a score based on the rule determined in advance (step A3). The pedestrian detection engine 141 decides whether or not the score satisfies the defined criterion (step A4). For example, if the probability that a person in the image is a pedestrian is 99%, then the pedestrian detection engine 141 sets the score to 99. When the score is, for example, equal to or higher than 80, the pedestrian detection engine 141 decides that a pedestrian is detected, but when the score is lower than 80%, the pedestrian detection engine 141 decides that a pedestrian is not detected. A default setting of the defined criterion for the score can be changed by the user itself.

If the score in detection of a pedestrian satisfies the defined criterion at step A4, then the alarm unit 160 originates an alarm by sound or the like from the mobile terminal 100 (step A5). The display unit 170 may display a warning screen image of a pedestrian simultaneously with the alarm. This allows the driver of the automobile 50 to behave so as to prevent collision with a pedestrian.

After the alarm unit 160 originates the alarm, the sensor 113 of the mobile terminal 100 measures the velocity and the distance between the automobile 50 and the pedestrian. Then, the sensor 113 confirms whether or not an improvement action such as deceleration or lane change of the automobile 50 is carried out by the driver, for evading the pedestrian. If no improvement action is carried out, then the mobile terminal 100 controls the chassis controlling unit 51 of the automobile 50 to carry out an improvement action to compulsorily decelerate the automobile 50 or the like (step A6). For example, the mobile terminal 100 causes the steering controlling system 511 to carry out lane change thereby to prevent otherwise possible collision with the pedestrian. Otherwise, the mobile terminal 100 causes the ABS controlling system 512 to operate together with a braking operation so that the automobile 50 stops before it collides with the pedestrian. For example, when the position of the pedestrian is near to the automobile 50, the mobile terminal 100 may originate an alarm and immediately cause the chassis controlling unit 51 to carry out an improvement action.

On the other hand, if the score in detection of a pedestrian does not satisfy the defined criterion at step A4 (for example, when the score is 60), then the mobile terminal 100 uses the image filter 142 to process the image (step A7). For example, the image filter 142 uses the brightness adjustment unit 143 to change the brightness of the image or uses the enlargement unit 144 to expand an image deemed as a pedestrian. The pedestrian detection engine 141 inputs the image obtained from the image filter 142 to attempt pedestrian detection again (step A8).

The pedestrian detection engine 141 confirms again whether or not the score satisfies the defined criterion (step A9). If the score satisfies the defined criterion, then the process at step A5 is carried out. On the other hand, if the score does not satisfy the defined criterion, then the image transmission unit 151 transmits the image after the filter processing to the pedestrian detection server 200 (step A10). The pedestrian detection server 200 receives the image (step A11) and uses the image filter 250 incorporated in the pedestrian detection server 200 to carry out processing of the image (step A12).

The pedestrian detection engine 260 detects a region deemed as a pedestrian from within the image sent thereto and outputs a detection rate as a score based on a rule determined in advance (step A13). The pedestrian detection engine 260 confirms whether or not the score of the processed pedestrian image satisfies the defined criterion (step A14). If the defined criterion is satisfied, then the processing advances to step A5. If the defined criterion is not satisfied, then the pedestrian detection engine 260 accesses the pedestrian image database 270 to search for and extract a similar image of a high resolution (step A15). In the pedestrian image database 270, images of high resolutions from which pedestrians and so forth of various magnifications and various forms are detected are stored as an outcome "dictionary" in advance. The pedestrian detection engine 260 refers to this dictionary to search for and extract image data of a pedestrian most similar to the input image.

The pedestrian detection engine 260 carries out a pedestrian detection process again for the image extracted from the pedestrian image database 270 (step A16). Then, the pedestrian detection engine 260 confirms whether or not the detection score satisfies the defined criterion (step A17). If the defined criterion is satisfied, then the processing advances to step A5. If the defined criterion is not satisfied, namely, if a pedestrian is not detected, then the pedestrian detection server 200 transmits to the mobile terminal 100 a message representing that no pedestrian is detected.

It is to be noted that the mobile terminal 100 may transmit the captured image as it is to the pedestrian detection server 200 without carrying out the working process by the image filter 142. Or, the pedestrian detection server 200 may carry out only one of the detection process (steps A12 to A14) in which the image filter 250 is used and the detection process (steps A15 to A17) in which the pedestrian image database 270 is used.

Figure 3:
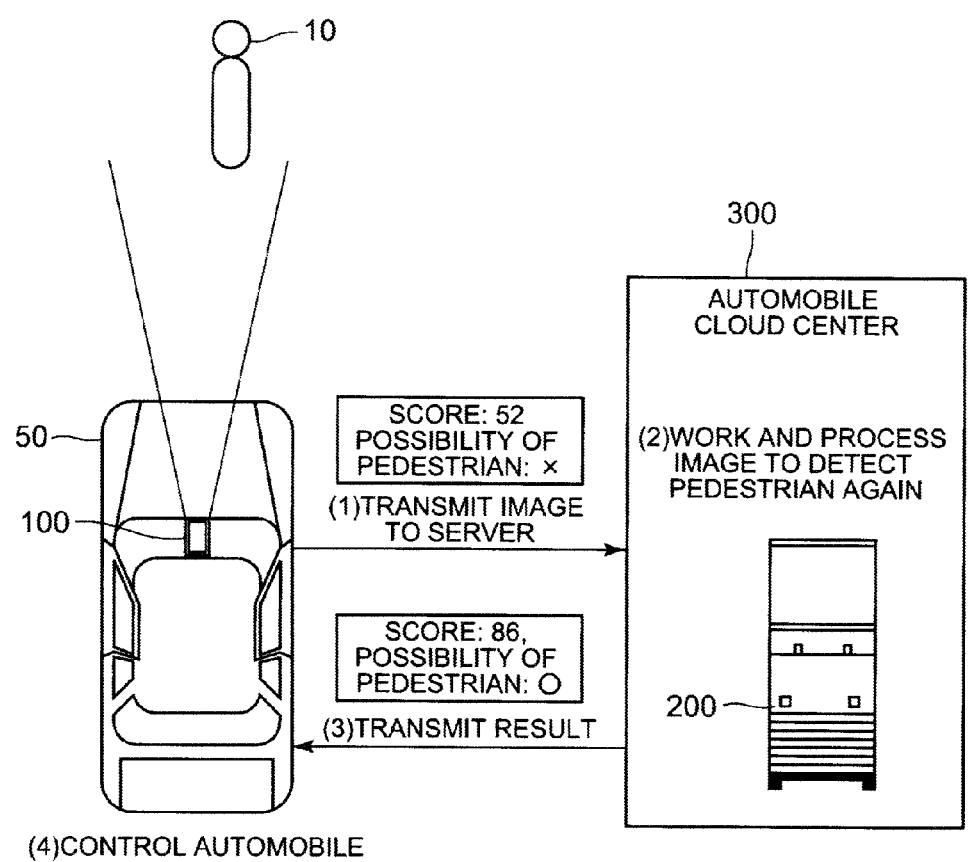
FIG. 3 It depicts a schematic view showing a working example of the driver assistance system.

Now, a working example of the driver assistance system of the present exemplary embodiment is described. FIG. 3 is a schematic view showing the working example of the driver assistance system.

Referring to FIG. 3, the mobile terminal 100 incorporated in the automobile 50 captures an image within a range including a pedestrian 10. Then, the pedestrian detection engine 141 detects whether or not the captured image includes a pedestrian. For example, if the image is unclear, then even if the image actually includes a pedestrian, the pedestrian detection engine 141 may decide that the image does not include a pedestrian. In the present working example, it is assumed that the score is 52 and the pedestrian detection engine 141 decides that the image does not include a pedestrian.

In this instance, the image filter 142 carries out image working again. Then, the pedestrian detection engine 141 carries out image detection again. Here, it is assumed that a similar result is obtained. The mobile terminal 100 transmits the decision result and the image to the pedestrian detection server 200 in an automobile crowd center 300.

The pedestrian detection server 200 works the image transmitted thereto using the image filter 250. Then, the pedestrian detection engine 260 carries out detection of a pedestrian. If the score by the detection is lower than the defined criterion, then the pedestrian detection engine 260 uses the pedestrian image database 270 to extract a similar image. It is assumed that the score by this detection is 86 and it is decided that the image includes a pedestrian. The pedestrian detection server 200 transmits the decision result to the mobile terminal 100.

When the mobile terminal 100 receives the decision result that the image includes a pedestrian, it issues a warning to the driver using the alarm unit 160. If the driver does not carry out an evasive action after the alarm is issued, then the mobile terminal 100 sends an instruction to the chassis controlling unit 51 of the automobile 50 to carry out control for evading the pedestrian 10. When the instruction is received, the chassis controlling unit 51 controls, for example, steering controlling system 511 to operate to evade the pedestrian 10. Or, the chassis controlling unit 51 carries out braking operation and control by the ABS controlling system 512 to stop the automobile 50.

With the driver assistance system of the present exemplary embodiment, since the pedestrian detection server 200 carries out a detection process of a high degree of accuracy, which cannot be carried out by the mobile terminal 100, a pedestrian can be detected with a high degree of accuracy. Consequently, the driver assistance system of the present exemplary embodiment can prevent an accidental collision between the automobile and a pedestrian or a like accident.

Figure 4:
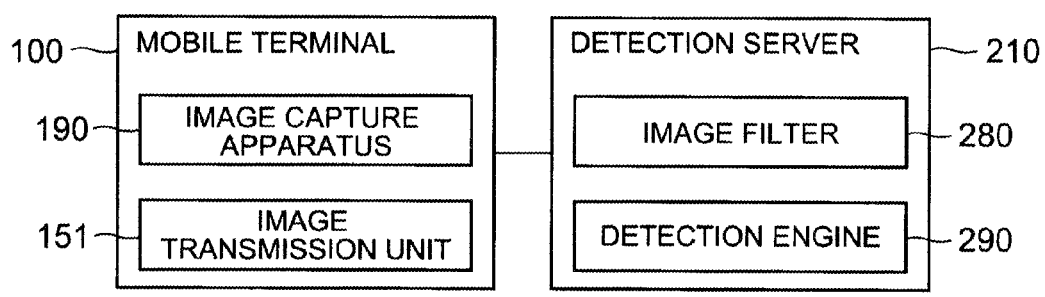
FIG. 4 It depicts a block diagram showing a configuration of major part of the driver assistance system according to the present invention.

FIG. 4 is a block diagram showing a configuration of major part of the driver assistance system according to the present invention. Referring to FIG. 4, the driver assistance system according to the present invention includes a mobile terminal 100 provided on an automobile, and a detection server 210 capable of communicating with the mobile terminal 100. The mobile terminal 100 includes an image capture apparatus 190 for capturing an image around the automobile, and an image transmission unit 151 for transmitting the captured image to the detection server 210. The detection server 210 includes a image filter 280 which carries out a working process of an image, and a detection engine 260 which receives an image inputted thereto after the working process by the image filter 280 and which detects whether or not the image includes an object. If it is decided that an object is included in the image, then the detection server 210 transmits the decision result to the mobile terminal.

Further, in the exemplary embodiment described above, also driver assistance system described in (1) to (6) below are disclosed.

(1) A driver assistance system including a mobile terminal (for example, a mobile terminal 100) provided on an automobile (for example, an automobile 50), and a detection server (for example, a pedestrian detection server 200) capable of communicating with the mobile terminal, the mobile terminal including an image capture apparatus (for example, a camera 180) configured to capture an image around the automobile, and an image transmission unit (for example, an image transmission unit 151) configured to transmit the captured image to the detection server, the detection server including an image filter (for example, an image filter 250) configured to carry out a working process for the image, and a detection engine (for example, a pedestrian detection engine 260) configured to receive the image inputted thereto after the working process by the image filter and detect whether or not the image includes an object (for example, a pedestrian), the detection server transmitting, when it is detected that the image includes an object, the result of the decision to the mobile terminal.

(2) The driver assistance system may be configured such that the detection server further includes a storage apparatus (for example, a pedestrian image database 270) in which a plurality of images are stored in advance, and the detection engine extracts, from among the plurality of images stored in the storage apparatus, an image similar to the image transmitted thereto from the mobile terminal and detects whether or not the extracted image includes an object.

(3) The driver assistance system may be configured such that the image filter includes a rain removing unit (for example, a rain removing unit 253) configured to remove a region in which rain is pictured from within the image inputted thereto.

(4) The driver assistance system may be configured such that the image filter includes a super-resolution unit (for example, a super-resolution unit 254) which superimposes the plurality of images inputted thereto to produce an image of a high resolution.

(5) The driver assistance system may be configured such that the mobile terminal further includes an alarm unit (for example, an alarm unit 160) which issues a warning to a driver of the vehicle when a result of decision that the image includes an object is received. With such a driver assistance system as just described, when an object exists around the vehicle, the driver assistance system can cause the driver to evade the object.

(6) The driver assistance system may be configured such that, when the mobile terminal receives a result of decision that the image includes an object, the mobile terminal carries out control (for example, control by a chassis controlling unit 51) for causing the vehicle to evade the object. With such a driver assistance system as just described, when an object exists around the vehicle, the driver assistance system can cause the automobile to automatically evade the object.

In the general technology disclosed in Japanese Patent Laid-Open No. 2010-250501 and so forth, an ECU detects a pedestrian or the like based on an image captured by a camera mounted on the vehicle. Therefore, there is a subject that, if the processing capacity of the ECU is low, then the recognition rate is low and false recognition is likely to occur.

Further, if the general image recognition technology is used for the detection, then it is necessary to write an image pattern of an object into the ECU chip in advance, and if image data different from the image patterns registered in advance is inputted, then the recognition rate drops. Since a system incorporated in a vehicle has a small storage capacity, image patterns which can be registered in advance are limited, and there is a subject that the recognition rate is low. It is to be noted that an image pattern includes an image in which, for example, a pedestrian is in a state in which is riding a bicycle or in another state in which a pedestrian is walking while pushing a cart is pictured.

With the present invention, an object around a vehicle can be detected with a high degree of accuracy.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A driver assistance system, comprising:
a mobile terminal provided on an automobile; and
a detection server capable of communicating with the mobile terminal;
the mobile terminal including:
an image capture apparatus configured to capture an image around the automobile; and an image transmission unit configured to transmit the captured image to the detection server;

the detection server including:
- an image filter configured to carry out a working process for the image; and
- a detection engine configured to receive the image inputted thereto after the working process by the image filter and detect whether or not the image includes an object;

the detection server transmitting, when it is detected that the image includes an object, the result of the decision to the mobile terminal, wherein the image filter includes a rain removing unit configured to remove a region in which rain is pictured from within the image inputted thereto.

2. The driver assistance system according to claim 1, wherein the detection server further includes a storage apparatus in which a plurality of images are stored in advance, and the detection engine extracts, from among the plurality of images stored in the storage apparatus, an image similar to the image transmitted thereto from the mobile terminal and detects whether or not the extracted image includes an object.

3. The driver assistance system according to claim 2, wherein the image filter includes a super-resolution unit which superimposes the plurality of images inputted thereto to produce an image of a high resolution.

4. The driver assistance system according to claim 2, wherein the mobile terminal further includes an alarm unit which issues a warning to a driver of the vehicle when a result of decision that the image includes an object is received.

5. The driver assistance system according to claim 2, wherein, when the mobile terminal receives a result of decision that the image includes an object, the mobile terminal carries out control for causing the vehicle to evade the object.

6. The driver assistance system according to claim 1, wherein the image filter includes a super-resolution unit which superimposes the plurality of images inputted thereto to produce an image of a high resolution.

7. The driver assistance system according to claim 6, wherein the mobile terminal further includes an alarm unit which issues a warning to a driver of the vehicle when a result of decision that the image includes an object is received.

8. The driver assistance system according to claim 6, wherein, when the mobile terminal receives a result of decision that the image includes an object, the mobile terminal carries out control for causing the vehicle to evade the object.

9. The driver assistance system according to claim 1, wherein the mobile terminal further includes an alarm unit which issues a warning to a driver of the vehicle when a result of decision that the image includes an object is received.

10. The driver assistance system according to claim 9, wherein, when the mobile terminal receives a result of decision that the image includes an object, the mobile terminal carries out control for causing the vehicle to evade the object.

11. The driver assistance system according to claim 1, wherein, when the mobile terminal receives a result of decision that the image includes an object, the mobile terminal carries out control for causing the vehicle to evade the object.

12. A driver assistance method, comprising:
- transmitting an image around an automobile, the image captured by a mobile terminal provided on the automobile, to a detection server which is capable of communicating with the mobile terminal;
- carrying out a working process for the image by the detection server;
- detecting whether or not the image after the working process includes an object by the detection server;
- transmitting, when it is decided that the image includes an object, the result of the decision to the mobile terminal by the detection server; and
- removing a region in which rain is pictured from within the image inputted thereto by the detection server.

13. The driver assistance method according to claim 12, wherein the detection server stores a plurality of images therein in advance, and extracts, from among the plurality of stored images, an image similar to the image transmitted from the mobile terminal, and detects whether or not the extracted image includes an object.

14. A non-transitory computer-readable information storage medium storing a driver assistance program that, when executed by an information processing device, causes execution of a method comprising:
- inputting an image around an automobile, the image captured by an image capture apparatus provided in a mobile terminal provided on the automobile, and carrying out a working process for the image;
- inputting the image after the working process and detecting whether or not the image includes an object;
- transmitting, when it is decided that the image includes an object, the result of the decision to the mobile terminal; and
- removing a region in which rain is pictured from within the image inputted thereto.

15. The non-transitory computer-readable information storage medium according to claim 14 storing the driver assistance program that, when executed by the information processing device, causes the execution of the method further comprising:
- storing a plurality of images in advance; and
- extracting, from among the plurality of stored images, an image similar to the image transmitted from the mobile terminal and detecting whether or not the extracted image includes an object.

* * * * *